United States Patent
Yamada et al.

(10) Patent No.: US 8,046,137 B2
(45) Date of Patent: *Oct. 25, 2011

(54) MICROCONTROLLER, CONTROL SYSTEM AND DESIGN METHOD OF MICROCONTROLLER

(75) Inventors: Hiromichi Yamada, Hitachi (JP); Nobuyasu Kanekawa, Hitachi (JP); Teruaki Sakata, Tokai (JP)

(73) Assignee: Renesas Electronics Corporation, Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/004,414

(22) Filed: Jan. 11, 2011

(65) Prior Publication Data
US 2011/0106335 A1 May 5, 2011

Related U.S. Application Data

(63) Continuation of application No. 12/388,861, filed on Feb. 19, 2009, now Pat. No. 7,890,233.

(30) Foreign Application Priority Data

Mar. 27, 2008 (JP) ................................ 2008-082460

(51) Int. Cl.
*G06F 17/00* (2006.01)
*G06F 17/50* (2006.01)
*G06F 1/04* (2006.01)
*G06F 11/00* (2006.01)

(52) U.S. Cl. ................. 701/45; 701/33; 701/39; 701/43; 701/62; 701/76; 701/92; 701/97; 701/107; 716/12; 716/6; 713/375; 713/400; 714/47; 714/48; 714/707

(58) Field of Classification Search ............ 701/29, 701/33, 39, 45, 48, 62, 76, 92, 97, 107; 713/375, 713/400; 714/47, 48, 707; 716/6, 12
See application file for complete search history.

(56) References Cited

U.S. PATENT DOCUMENTS
5,895,434 A 4/1999 Fennel et al.
(Continued)

FOREIGN PATENT DOCUMENTS
JP 10-11309 1/1998
(Continued)

OTHER PUBLICATIONS
"Fault Tolerance Achieved in VLSI" by Richard Emmerson, 1984 IEEE.

*Primary Examiner* — Vibol Tan
(74) *Attorney, Agent, or Firm* — Mattingly & Malur, PC

(57) ABSTRACT

Two data processing units having the same function, one of which is used for a master and the other for comparison, are provided, control of a circuit unit is performed by the master, the master data processing unit and the circuit unit are operated in synchronization with a first clock signal, the second data processing unit is operated in synchronization with a second clock signal having the same cycle and different phase from the first clock signal, and processing results of both the data processing units are compared in a comparison circuit. Flip flops are disposed on a signal path from the circuit unit to the comparison data processing unit and on a signal path from the master data processing unit to the comparator, and both the first and second clock signals are used for latch clocks of the flip flops in accordance with input signals thereof.

12 Claims, 12 Drawing Sheets

U.S. PATENT DOCUMENTS

| | | |
|---|---|---|
| 6,078,202 A | 6/2000 | Tomatsuri et al. |
| 6,173,229 B1 | 1/2001 | Fennel et al. |
| 6,421,790 B1 | 7/2002 | Fruehling et al. |
| 6,463,373 B2 | 10/2002 | Suganuma et al. |
| 6,591,167 B1 | 7/2003 | Minowa et al. |
| 6,625,688 B1 | 9/2003 | Fruehling et al. |
| 6,981,176 B2 | 12/2005 | Fruehling et al. |
| 6,986,029 B2 * | 1/2006 | Yamada et al. ............... 712/300 |
| 7,590,208 B2 | 9/2009 | Migita et al. |
| 7,630,807 B2 | 12/2009 | Yoshimura et al. |
| 2005/0038585 A1 | 2/2005 | Asaumi et al. |
| 2007/0156310 A1 | 7/2007 | Hirano et al. |
| 2008/0059666 A1 | 3/2008 | Yamada |
| 2008/0126718 A1 | 5/2008 | Kottke et al. |
| 2008/0163035 A1 | 7/2008 | Kottke |
| 2008/0209251 A1 | 8/2008 | Kottke |
| 2008/0243335 A1 | 10/2008 | Rao et al. |
| 2009/0164826 A1 | 6/2009 | Kottke |
| 2010/0017543 A1 | 1/2010 | Preston et al. |

FOREIGN PATENT DOCUMENTS

| | | |
|---|---|---|
| JP | 11-312027 A | 11/1999 |
| JP | 2003-224550 A | 8/2003 |
| JP | 2008-518311 A | 5/2008 |
| WO | 2006/045802 A2 | 5/2006 |

* cited by examiner

MICROCONTROLLER, CONTROL SYSTEM AND DESIGN METHOD OF MICROCONTROLLER

CROSS-REFERENCE TO RELATED APPLICATION

This application is a continuation application of U.S. Ser. No. 12/388,861, filed Feb. 19, 2009, the entire disclosure of which is incorporated herein by reference.

The present application claims priority from Japanese Patent Application No. JP 2008-082460 filed on Mar. 27, 2008, the content of which is hereby incorporated by reference into this application.

TECHNICAL FIELD OF THE INVENTION

The present invention relates to a microcontroller including a pair of data processing units having the same function, one of which is used for control and the other for comparison, and also to a technique effectively applied to, for example, a control system of an automobile.

BACKGROUND OF THE INVENTION

A microcontroller is a semiconductor integrated circuit which is incorporated in equipment such as home electric appliances, AV equipment, cellular phones, automobiles and industrial machines and controls the equipment by performing processes in accordance with a program stored in a memory.

Since the failure of a control unit is likely to result in an accident in an automobile, a component including a microcontroller is required to have high reliability, and it is designed to implement a safety function when a failure has occurred so that an automobile does not enter a dangerous situation by detecting the failure. The microcontroller needs not only to detect the failure by checking a sensor and an actuator but also to detect a failure of the microcontroller itself.

There are various methods for the failure detection of the microcontroller. For example, a technique in which duplexed CPUs (Central Processing Unit) as data processing units are made to perform the same process and values of the buses thereof are constantly compared has been frequently employed. "Fault Tolerance Achieved in VLSI" IEEE MICRO, December, 1984 (patent document 1) has disclosed a method in which a master CPU and a comparison CPU simultaneously perform the same process and the respective results are compared in a comparison circuit. Japanese Patent Application Laid-Open Publication No. 10-11309 (patent document 2) has disclosed a technique in which a comparison CPU performs a process in a delayed manner with respect to a master CPU by 0.5+n (n is an integer of 0 or larger) cycle and a result obtained by delaying a result of the master CPU by 0.5+n cycle and a result of the comparison CPU are compared in a comparator.

SUMMARY OF THE INVENTION

Of the conventional techniques, in the method in which a master CPU and a comparison CPU simultaneously perform the same process, the number of signals changed after a rising edge of a clock is doubled or more compared to the case where duplexed CPUs are not provided. Therefore, the peak value of the power supply noise is increased, and a failure that the signal value is affected and becomes incorrect occurs frequently. On the other hand, in the method of the patent document 2, since clocks of the two CPUs are shifted by 0.5 cycle, the signal changes in the respective CPUs are shifted by 0.5 cycle, and the peak of the power supply noise is divided to two parts in 1 cycle, so that the value thereof is reduced by half.

However, in order to operate the clocks of the two CPUs with a shift of 0.5 cycle and to match the phases of the outputs of the two CPUs to make them comparable, an input signal of the comparison CPU and a signal from the master CPU to the comparator are once held in respective flip flops changed by a clock of the comparison CPU, and then inputted to the comparison CPU and the comparator. Therefore, transfer of the input signals supplied to the respective flip flops has to be completed in 0.5 cycle of the clock of the master CPU, and severe restriction is imposed on an operation frequency, so that there arises another problem that it is hard to increase the operation frequency of the microcontroller.

An object of the present invention is to provide a microcontroller which can suppress a noise peak of a pair of data processing units having the same function, one of which is used for control and the other for comparison, and can be easily adapted to the high-speed processing.

The above and other objects and novel characteristics of the present invention will be apparent from the description of this specification and the accompanying drawings.

The typical ones of the inventions disclosed in this application will be briefly described as follows.

That is, two data processing units having the same function, one of which is used for a master and the other for comparison, are provided, control of a circuit unit is performed by the master data processing unit, the master data processing unit and the circuit unit are operated in synchronization with a first clock signal, the second data processing unit is operated in synchronization with a second clock signal having the same cycle and different phase from the first clock signal, processing results of both the data processing units are compared in a comparison circuit, thereby detecting an operation defect due to a failure of the master data processing unit or an external disturbance. A flip flop is disposed on each of a signal path from the circuit unit to the comparison data processing unit and a signal path from the master data processing unit to the comparator, and the first clock signal and the second clock signal are adopted as clock signals for defining latch timings of the plurality of flip flops (simply referred to as latch clock) depending on the input signals thereof. The input signal of the flip flop using the second clock signal as the latch clock is a signal that is in time for the transfer within the phase difference between the first clock signal and the second clock signal.

Since the second clock signal is used as the latch clock only for the flip flop to which the signal that is in time for the transfer within the phase difference between the first clock signal and the second clock signal is inputted, the first clock signal is used for the latching of the signal whose transfer timing is delayed from it, and it is not necessary to decrease the frequency of the clock signal. Since the master data processing unit and the comparison data processing unit are operated by the clock signals having different phases, the peak of the power supply system noise can be reduced compared with the case where the clock signals having the same phase are used, and further the defects can be detected even when the master data processing unit and the comparison data processing unit have the same failure.

The effects obtained by typical one of the inventions disclosed in this application will be briefly described below.

That is, it is possible to realize a microcontroller which can suppress a noise peak of a pair of data processing units having the same function, one of which is used for control and the other for comparison, and can be easily adapted to the high-speed processing without imposing severe restrictions on an operation frequency.

BRIEF DESCRIPTIONS OF THE DRAWINGS

DESCRIPTIONS OF THE PREFERRED EMBODIMENTS

1. Overview of Embodiments

Figure 1:
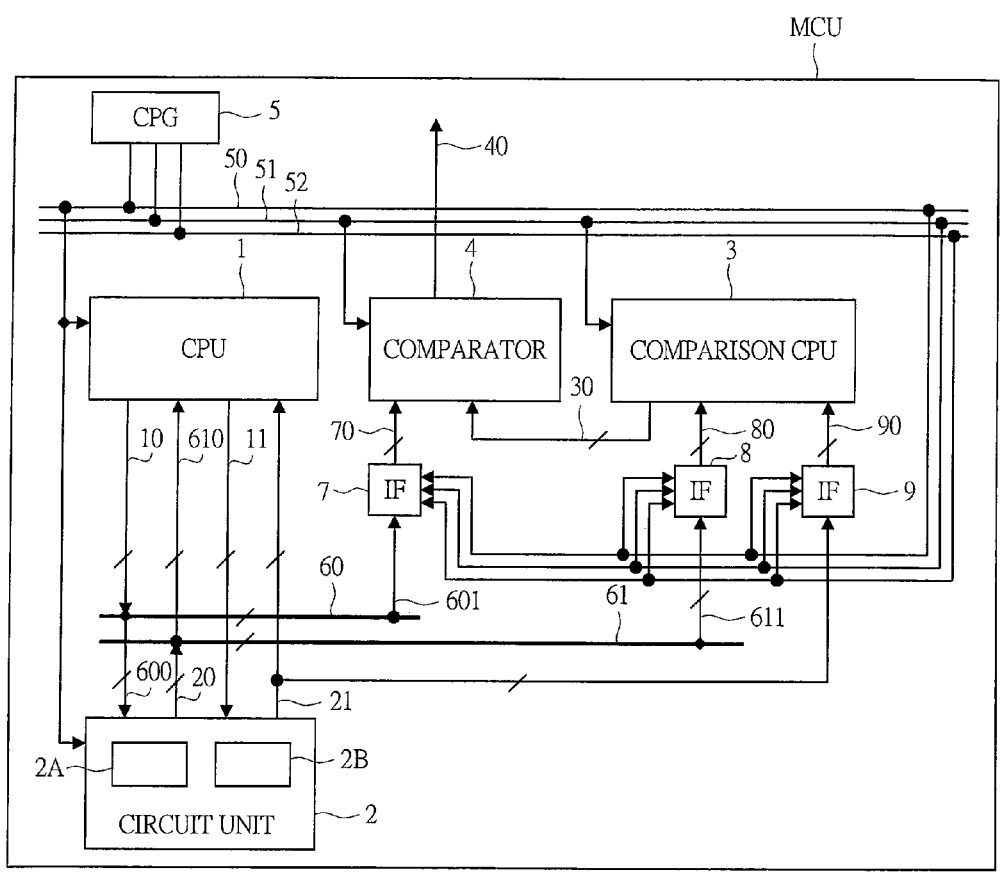
FIG. 1 is a block diagram showing an example of a microcontroller MCU according to the present invention.

First, overview of the typical embodiments of the present invention disclosed in this application will be described. Reference numerals in the drawings referenced in parentheses in the overview of the typical embodiments merely exemplify those included in the concept of constituent elements to which the numerals are attached.

(1) A microcontroller according to an embodiment of the present invention comprises: a first data processing unit (1) operated in synchronization with a first clock signal (50); a circuit unit (2) operated in synchronization with the first clock signal based on a control of the first data processing unit; and a second data processing unit (3) which performs the same data processing as that of the first data processing unit in synchronization with a second clock signal (51) having the same cycle and different phase from the first clock signal. The microcontroller further comprises: a first interface circuit (7) having a plurality of flip flops for holding a first signal (601) outputted from the first data processing unit to the circuit unit; a comparator (4) which compares a second signal (30) outputted from the second data processing unit in response to an output of the first signal by the first data processing unit and the signal held in the first interface circuit in synchronization with the second clock signal; and second interface circuits (8, 9) each having a plurality of flip flops which hold third signals (611, 21) supplied from the circuit unit to the first data processing unit and output the signals to the second data processing unit. The plurality of flip flops (FF) provided in the first and second interface circuits include those using the first clock signal for defining a latch timing and those using the second clock signal for the same.

Since the second clock signal is used as the latch clock only for the flip flop to which the signal that is in time for the transfer within the phase difference between the first clock signal and the second clock signal is inputted, the first clock signal is used for the latching of the signal whose transfer timing is delayed from it, and it is not necessary to decrease the frequency of the clock signal. Further, when the operation frequency is to be increased, adaptation to the high-speed operation is possible by the simple design change of changing the latch clock of a part of the flip flops from the second clock to the first clock. Also, since both the data processing units are operated by the clock signals each having different phases, the peak of the power supply system noise can be reduced compared with the case where the clock signals having the same phase are used, and further the defects can be detected even when the same failure occurs in both the data processing units.

(2) In the microcontroller of the item (1), the plurality of flip flops provided in the first and second interface circuits can further include those using a third clock signal (52), which has a phase difference from the first clock signal larger than that of the second clock signal, for defining the latch timing. The input data is required to be transferred from the circuit unit to the flip flop using the second clock signal as the latch clock within the phase difference between the first clock signal and the second clock signal, and the output data of the flip flop may be transferred to the second data processing unit within the 1 cycle of the second clock signal. On the other hand, the input data may be transferred from the circuit unit to the flip flop using the first clock signal as the latch clock within the 1 cycle of the first clock, but the output data of the flip flop is required to be transferred to the second data processing unit within the phase difference between the second clock signal and the first clock signal. The input data may be transferred from the circuit unit to the flip flop using the third clock signal as the latch clock within the phase difference between the first clock and the third clock, and the output data of the flip flop may be transferred to the second data processing unit within the phase difference between the third clock signal and the second clock signal. A transfer condition on an input side and a transfer condition on an output side of the flip flop are mutually reversed between the case where the first clock signal is used as the latch clock and the case where the second clock signal is used as the latch clock, and either one of the input side and the output side has a severer transfer condition. When the third clock signal is used for the latch timing, the difference in the transfer condition between the input side and the output side is reduced. Therefore, when the transfer condition when the first clock signal is used for the latch timing and the transfer condition when the second clock is used for the latch timing cannot be satisfied, the transfer condition can be satisfied in some cases by using the third clock signal for the latch timing. In this manner, the flexibility to the request of increasing the operation speed can be enhanced.

(3) In the microcontroller of the item (1), the phase difference between the first clock signal and the second clock signal is, for example, 180 degrees. In this case, the transfer cycle on an input side of the flip flop whose timing is controlled by the first clock signal corresponds to 1 cycle of the first clock signal, and the transfer cycle on an output side thereof corresponds to 0.5 cycle of the second clock signal. The transfer cycle on an input side of the flip flop whose timing is controlled by the second clock signal corresponds to 0.5 cycle of the first clock signal, and the transfer cycle on an output side thereof corresponds to 1 cycle of the second clock signal.

(4) In the microcontroller of the item (3), the phase difference between the first clock signal and the second clock signal is, for example, 180 degrees, and the phase difference between the first clock signal and the third clock signal is in a range from 190 degrees to 350 degrees.

(5) In the microcontroller of the item (3), the phase difference between the first clock signal and the third clock signal is, for example, 270 degrees. In this case, the transfer cycle on an input side of the flip flop whose timing is controlled by the first clock signal corresponds to 1 cycle of the first clock signal, and the transfer cycle on an output side thereof corresponds to 0.5 cycle of the second clock signal. The transfer cycle on an input side of the flip flop whose timing is controlled by the second clock signal corresponds to 0.5 cycle of the first clock signal, and the transfer cycle on an output side thereof corresponds to 1 cycle of the second clock signal. The transfer cycle on an input side of the flip flop whose timing is controlled by the third clock signal corresponds to 0.75 cycle of the first clock signal, and the transfer cycle on an output side thereof corresponds to 0.75 cycle of the second clock signal.

(6) In the microcontroller of the item (2), the first signal is, for example, a command, an address and write data outputted from the first data processing unit to a bus. The second signal is a command, an address and write data outputted from the second data processing unit. The third signal is read data and a command outputted from a memory to the bus in accordance with the command and the address outputted from the first data processing unit to the bus.

(7) In the microcontroller of the item (6), the third signal is data outputted from a peripheral circuit, which is operated in accordance with control data outputted from the first data processing unit, to the first data processing unit and the second data processing unit.

(8) A control system according to an embodiment of the present invention comprises: a control circuit (1400); sensors (1100, 1200, 1201, 1300) whose outputs are connected to the control circuit; and an actuator (1600) whose operation is controlled by the control circuit, and it controls an automotive powertrain system. The control circuit includes: a first data processing unit operated in synchronization with a first clock signal; a circuit unit operated in synchronization with the first clock signal based on a control of the first data processing unit; and a second data processing which performs the same data processing as that of the first data processing unit in synchronization with a second clock signal having the same cycle and different phase from the first clock signal. The microcontroller further includes: a first interface circuit having a plurality of flip flops for holding a first signal outputted from the first data processing unit to the circuit unit; a comparator which compares a second signal outputted from the second data processing unit in response to an output of the first signal by the first data processing unit and the signal held in the first interface circuit in synchronization with the second clock signal; and second interface circuits each having a plurality of flip flops which hold third signals supplied from the circuit unit to the first data processing unit and output the signals to the second data processing unit. The plurality of flip flops provided in the first and second interface circuits include those using the first clock signal for defining a latch timing and those using the second clock signal for the same.

(9) In the control system of the item (8), the plurality of flip flops provided in the first and second interface circuits further include, for example, those using a third clock signal, which has a phase difference from the first clock signal larger than that of the second clock signal, for latch operation.

(10) A design method of a microcontroller according to the present invention is a design method for generating gate-level netlist (2200) from hardware description language (2000) of the microcontroller of the item (1) by using a computer device, and the method comprises the steps of: generating the gate-level netlist by inputting clock candidate data (2003) for specifying which of the first clock signal and the second clock signal is to be used as the latch clock of the respective flip flops to computer devices (2100, 2300) together with hardware description language data; and determining adequacy of a clock candidate by a timing check using the generated gate-level netlist. In this manner, the allocation of the latch clocks to the flip flops can be easily optimized.

(11) The design method of a microcontroller of the item (10) further comprises the step of: correcting the gate-level netlist so that an inadequate clock candidate is replaced with an adequate clock candidate based on a determination result about the adequacy of the clock candidate. In this manner, the gate-level netlist in which the allocation of the latch clocks to the flip flops is optimized can be easily obtained.

(12) Another design method of a microcontroller according to the present invention is a design method for generating gate-level netlist from hardware description language of the microcontroller of the item (2) by using a computer device, and the method comprises the steps of: generating the gate-level netlist by inputting clock candidate data for specifying which of the first clock signal, the second clock signal and the third clock signal is to be used as the latch clock of the respective flip flops to computer devices together with hardware description language data; and determining adequacy of a clock candidate by a timing check using the generated gate-level netlist.

(13) The design method of a microcontroller of the item (12) further comprises the step of: correcting the gate-level netlist so that an inadequate clock candidate is replaced with an adequate clock candidate based on a determination result about the adequacy of the clock candidate.

2. Details of Embodiments

Embodiments of the present invention will be further described in detail. Hereinafter, best mode for embodying the present invention will be described in detail with reference to the accompanying drawings. Note that components having the same function are denoted by the same reference numbers throughout the drawings for describing the best mode for embodying the present invention, and the repetitive description thereof will be omitted.

In FIG. 1, an example of a microcontroller MCU according to the present invention is shown by a block diagram. A reference numeral 1 denotes a CPU (Central Processing Unit) as an example of a first data processing unit, which fetches a command and executes such processes as data transfer and operations by decoding the fetched command. A reference numeral 2 collectively denotes a circuit unit controlled by the CPU 1. The circuit unit 2 includes a circuit portion such as RAM, ROM and DMA controller connected via an inner bus (hereinafter, simply referred to as a bus connection circuit portion 2A) and a circuit portion such as an interrupt controller and other logic circuits connected via a dedicated signal line (hereinafter, simply referred to as individual connection circuit portion 2B).

The CPU 1 accesses the bus connection circuit portion 2A of the circuit unit 2 via buses 60 and 61. The bus 60 is used for a command, an address and write data, and the bus 61 is used for read data or command fetch. When the CPU 1 accesses the bus connection circuit portion 2A, a command and an address are outputted from an output path 10 to the bus 60 and are inputted to the bus connection circuit portion 2A from an input path 600. In the case of a read access, data is read out from an output path 20 of the bus connection circuit portion 2A to the bus 61, and the CPU 1 takes it in from an input path 610. In the case of a write access, the CPU 1 outputs write data from the output path 10 to the bus 60, and the write data is written in the bus connection circuit portion 2A from the input path 600. The CPU 1 supplies a signal to the individual connection circuit portion 2B of the circuit unit 2 via an individual signal line 11. An output from the individual connection circuit portion 2B is supplied to the CPU 1 via an individual signal line 21.

In order to improve the reliability of data processing by the duplexed redundant CPU, the microcontroller MCU includes a comparison CPU 3 as a second data processing unit, a comparator 4, and interface circuits (IF) 7 to 9. The comparison CPU 3 is a processor with the same configuration as the CPU 1. The comparison CPU 3 is connected to the bus 61 via the interface circuit 8 and is also connected to the individual signal line 21 via the interface circuit 9. An input signal 80 is read data, and an input signal 90 is an input from the individual connection circuit portion 2A of the circuit unit 2. An output signal 30 is a command, an address and write data corresponding to the command, the address and the write data outputted from the output path 10 to the bus 60 by the CPU 1, and it is not connected to the bus 60 and is used for the comparison with the command, the address and the write data outputted by the CPU 1. The interface circuit 7 takes the command, the address and the write data outputted by the CPU 1 for comparison. The comparison operation is carried out by the comparator 4.

The comparator 4 compares the output of the CPU 1 to the bus 60 and the output signal 30 of the comparison CPU 3. The comparison result is outputted by an output signal 40. For example, a logical value 0 of the signal 40 means match, and a logical value 1 means unmatch. The output signal 40 may be used as, for example, an interrupt signal to an interrupt controller of the circuit unit 2. When the comparison result of the CPU 1 is unmatch, the process of resetting the microcontroller MCU is probably carried out after making the transition to an exception processing program routine. Alternatively, a method in which the comparison result output signal 40 is outputted from an external terminal of the microcontroller MCU and a reset is applied to the microcontroller MCU by using an external watchdog timer may be adopted.

A clock generating circuit (CPG) 5 generates an internal clock of the microcontroller MCU. A reference numeral 50 denotes a clock signal used for a clock synchronous operation of the CPU 1 and the circuit unit 2, and a reference numeral 51 denotes a clock signal used for a clock synchronous operation of the comparison CPU 3 and the comparator 4. The clock signal 50 and the clock signal 51 have the same cycle and different phases shifted by 180 degrees. A clock signal 52 is supplied together with the clock signals 50 and 51 to the interface circuits 7, 8 and 9. The clock signal 52 has the same cycle as the clock signal 50 and a phase thereof is delayed by 270 degrees.

The interface circuits 7, 8 and 9 have flip flops for each of the input signals, and the flip flops use any of the clock signals 50, 51 and 52 as the latch clock for defining the latch timing thereof. The interface circuit 7 latches the command, the address and the write data of the bus 60 from an input path 601 by using any of the clock signals 50, 51 and 52 and supplies them as an output signal 70 to the comparator. The interface circuit 8 latches the read data of the bus 61 from an input path 611 by using any of the clock signals 50, 51 and 52 and supplies it as an output signal 80 to the comparison CPU 3. The interface circuit 9 latches the signal outputted to the CPU 1 from the circuit unit 2 through the individual signal line 21 by using any of the clock signals 50, 51 and 52 and supplies it as an output signal 90 to the comparison CPU 3.

Figure 2:
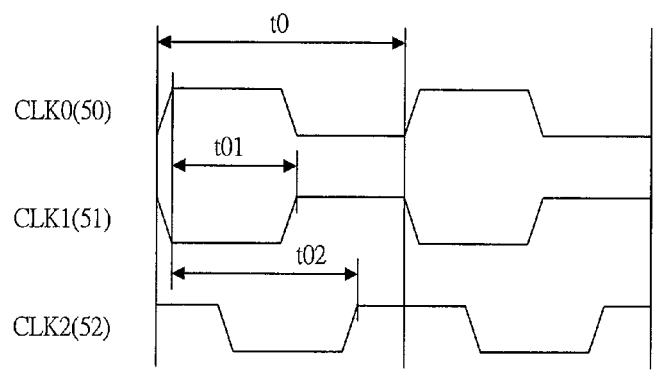
FIG. 2 is a waveform diagram showing three clocks generated by a clock generating circuit CPG in FIG. 1.

FIG. 2 shows three clocks generated by the CPG 5 in FIG. 1. CLK0 is the clock signal 50, CLK1 is the clock signal 51 and CLK2 is the clock signal 52. The three clock signals have the cycle of t0. The rising edge of the CLK1 is delayed with respect to the CLK0 by t01, and t01 is 0.5×t0 in the present embodiment and it means that the phase difference is 180 degrees. The rising edge of the CLK2 is delayed with respect to the CLK0 by t02, and t02 is 0.75×t0 in the present embodiment and it means that the phase difference is 270 degrees.

Figure 3:
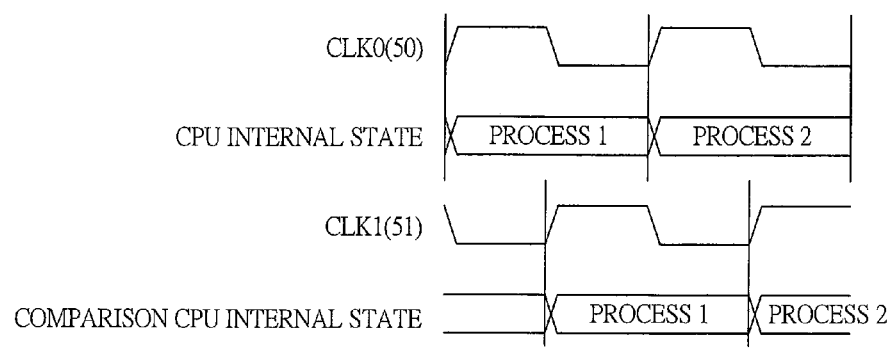
FIG. 3 is a timing chart showing internal states of a CPU and a comparison CPU in FIG. 1.

FIG. 3 shows internal states of the CPU 1 and the comparison CPU 3 in FIG. 1. The internal state of the CPU 1 changes in synchronization with the CLK0, and the internal state of the comparison CPU 3 changes in synchronization with the CLK1 with the 0.5 cycle delay from the CPU 1.

Figure 4:
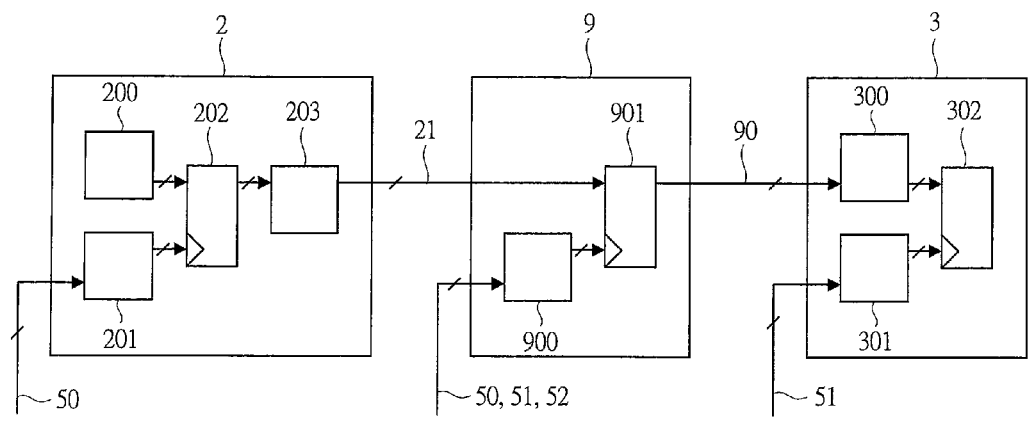
FIG. 4 is a block diagram showing an example of a signal transmission path from an individual connection circuit portion of a circuit unit to the comparison CPU in FIG. 1.

FIG. 4 shows a signal transmission path from the individual connection circuit portion 2B of the circuit unit 2 to the comparison CPU 3 in FIG. 1. In the circuit unit 2, blocks 200, 201 and 203 are combinational circuits, and a block 202 is a latch circuit also referred to as a flip flop. The combinational circuit 200 generates a signal to be the source of the signal 21 to the CPU 1 and the comparison CPU 3, and the signal is held in the flip flop 202. The combinational circuit 201 is a combinational circuit which generates a write clock of the flip flop 202 by using the clock signal 50. An output of the flip flop 202 becomes the signal 21 after passing through the combinational circuit 203. Although the signal 21 represents all of the signals from the circuit unit 2 to the CPU 1 and the comparison CPU 3 by one signal, it is a group of a number of signals with different meanings in practice. Also, the delay until the signal 21 is outputted from the flip flop 202 through the combinational circuit 203 differs depending on each of the signals constituting the signal 21.

In the interface circuit 9, a block 900 is a combinational circuit, and a block 901 is a flip flop. The combinational circuit 900 generates a write clock of the flip flop 901 by using the clock signals 50, 51 and 52. The flip flop holds the input signal 21 and outputs the signal 90 to the comparison CPU 3, and the delay of the input signal 21 determines which of the clock signals 50, 51 and 52 is to be used for the clock to be the source of the write clock.

In the comparison CPU 3, blocks 300 and 301 are combinational circuits, and a block 302 is a flip flop. The input signal 90 is held in the flip flop 302 through the combinational circuit 300. The combinational circuit 301 generates a write clock of the flip flop 302 by using the clock signal 51. In the case of the signal transfer from the circuit unit 2 to the CPU 1, the interface circuit 9 in FIG. 4 is unnecessary, and the signal 21 can be directly connected to the CPU 1 and the transfer in a path from the flip flop of the circuit unit 2 to the flip flop of the CPU 1 is carried out in 1 cycle. In the case of the comparison CPU 3, the processing is delayed by 0.5 cycle with respect to the CPU 1. Therefore, the path from the flip flop of the circuit unit 2 to the flip flop of the comparison CPU 3 is 1.5 cycle, and the signal has to be held once within 1 cycle. This is the function of the interface circuit 9. Since the interface circuits 7 and 8 in FIG. 1 are similar to the interface circuit 9, the description thereof is omitted.

Figure 5:
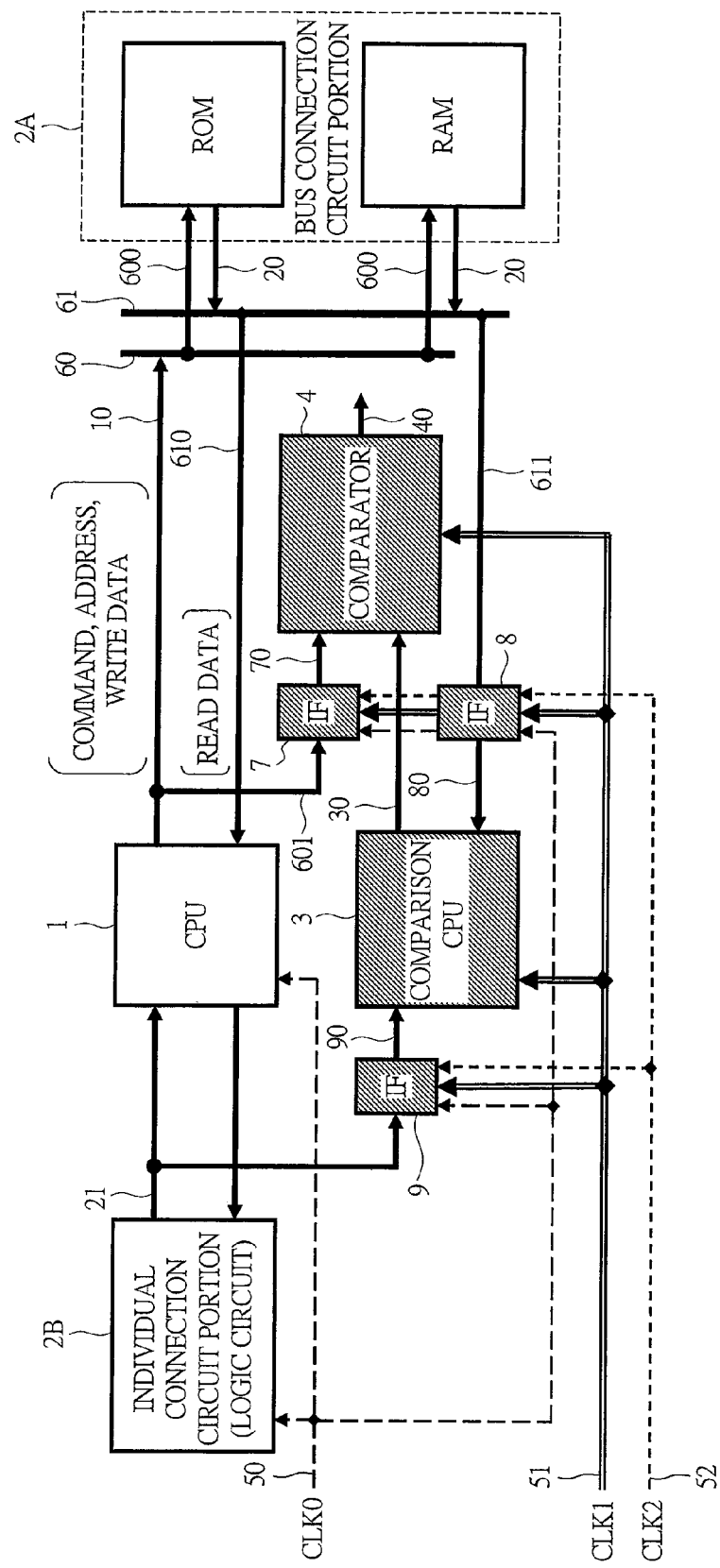
FIG. 5 is a block diagram showing a connection state of a bus connection circuit portion and interface circuits and a connection state of the individual connection circuit portion and an interface circuit in detail.

FIG. 5 shows details of the connection state of the bus connection circuit portion 2A and the interface circuits 7 and 8 and the connection state of the individual connection circuit portion 2B and the interface circuit 9 in FIG. 1.

Figure 6:
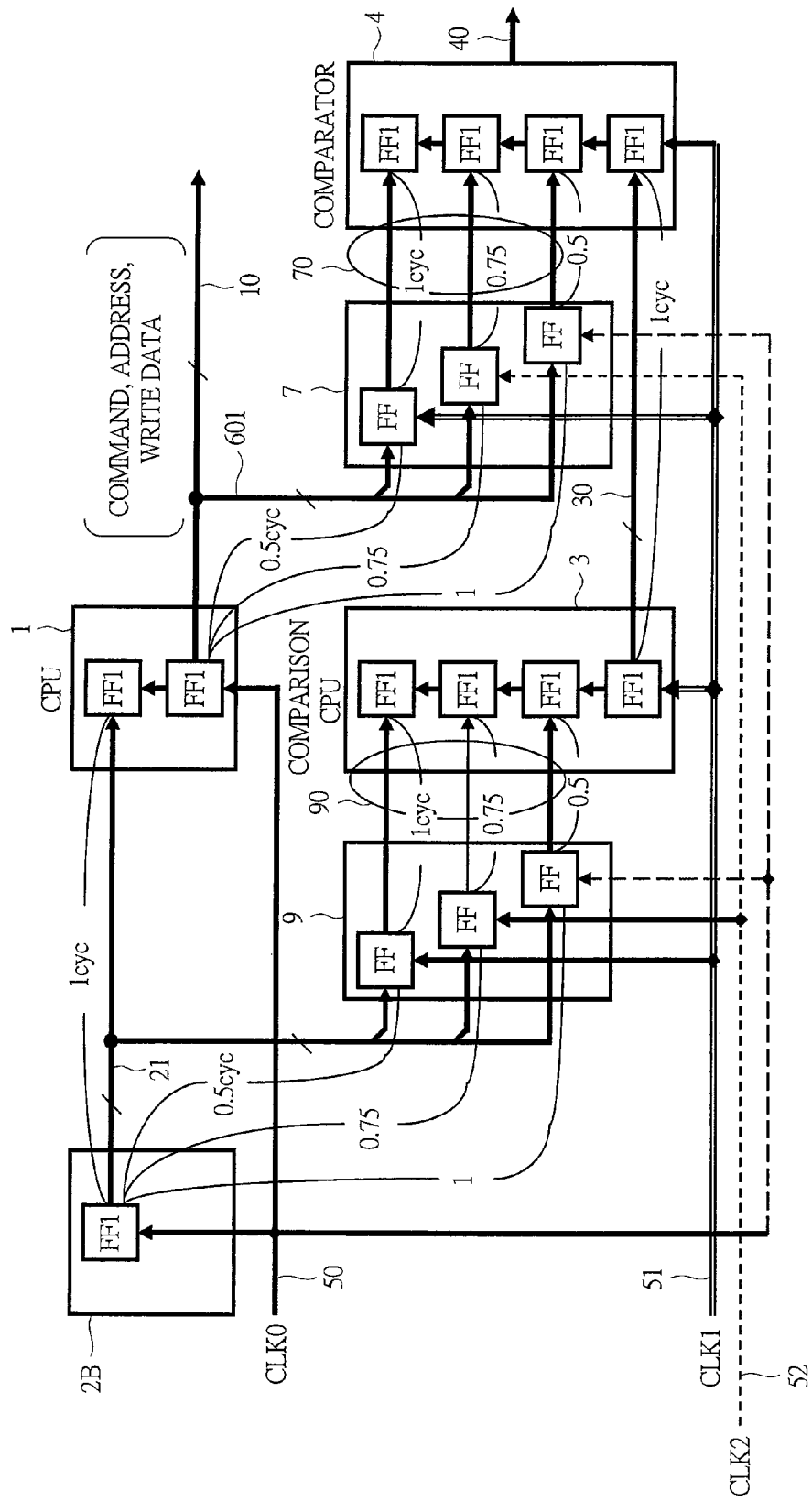
FIG. 6 is a block diagram showing an example of a signal transmission cycle in a signal path from the CPU through the interface circuit to a comparator and an example of a signal transmission cycle in a signal path from the individual connection circuit portion through the interface circuit to the comparator.

FIG. 6 shows an example of a signal transmission cycle in a signal path from the CPU 1 through the interface circuit 7 to the comparator 4 and an example of a signal transmission cycle in a signal path from the individual connection circuit portion 2B through the interface circuit 9 to the comparison CPU 3. Since a signal transmission cycle in a signal path from the bus connection circuit portion 2A through the interface 8 to the comparison CPU 3 is the same as the signal transmission cycle in the signal path from the individual connection circuit portion 2B through the interface circuit 9 to the comparator 4, the description thereof is omitted here. FF and FF1 denote flip flops and the flip flops FF1 on an input initial stage and an output final stage are representatively shown in the CPU 1, and the flip flop FF1 on an output final stage is representatively shown in the individual connection circuit portion 2B. The flip flops FF to which the clock signals 50 (CLK0), 51 (CLK1) and 52 (CLK2) are inputted as latch clocks are representatively shown in the interface circuits 7 and 9, respectively. Similarly, the flip flops FF1 on an input initial stage and an output final stage are representatively shown in the comparison CPU 3, and the flip flop FF1 on an input initial stage is representatively shown in the comparator 4.

In the interface circuit 9 disposed on the signal path from the individual connection circuit portion 2B to the comparison CPU 3, the transfer cycle from the former stage to the FF using the clock signal 50 (CLK0) as a latch clock is 1 cycle, and the transfer cycle from the FF to a next stage is 0.5 cycle. Similarly, the transfer cycle from the former stage to the FF using the clock signal 51 (CLK1) as a latch clock is 0.5 cycle and the transfer cycle from the FF to a next stage is 1 cycle, and further, the transfer cycle from the former stage to the FF using the clock signal 52 (CLK2) as a latch clock is 0.75 cycle and the transfer cycle from the FF to a next stage is 0.75 cycle. The same is true for the interface circuit 7 disposed on the signal path from the CPU 1 to the comparator 4. Which of the clock signals 50, 51 and 52 is to be used for the latch clock of the FF of the signal is determined in design by the delay of the signal as described above. For example, it is determined in a design stage where the logic synthesis is performed as described later.

Figure 7:
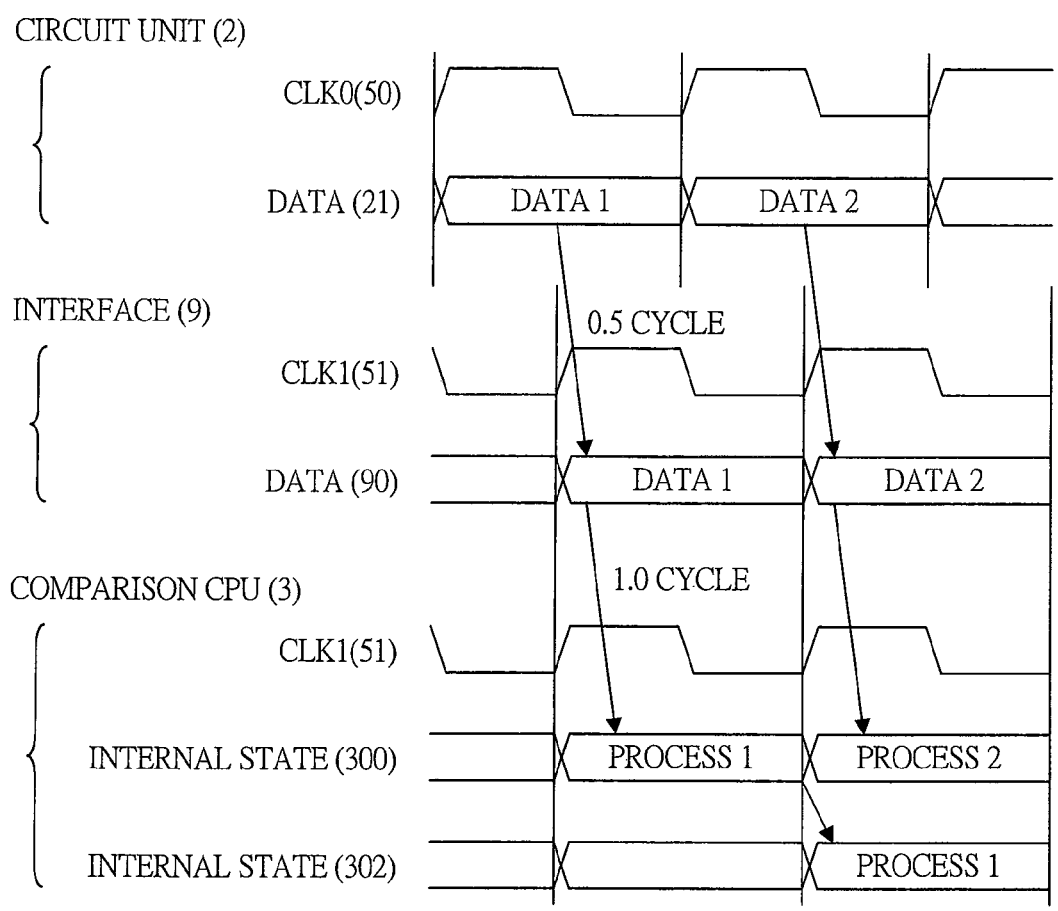
FIG. 7 is a timing chart in the case where a clock signal 51 is used as a clock of the interface circuit in FIG. 4.

FIG. 7 shows a timing chart in the case where the clock signal 51 is used as the clock of the interface circuit 9 in FIG. 4. The output signal 21 of the circuit unit 2 changes in synchronization with the clock signal 50, and the transfer cycle to the flip flop of the interface circuit 9 is 0.5. The comparison CPU 3 operates in synchronization with the clock signal 51, and the transfer cycle from the flip flop of the interface circuit 9 to the flip flop of the comparison CPU 3 is 1.0. This transfer method is effective when the delay of the signal 21 of the circuit unit 2 is small, for example, less than 40% of 1 cycle. When the delay is large, it is not in time for 0.5 cycle, and the data cannot be properly held in the flip flop. In order to make the transfer within 0.5 cycle, the operation frequency has to be decreased.

Figure 8:
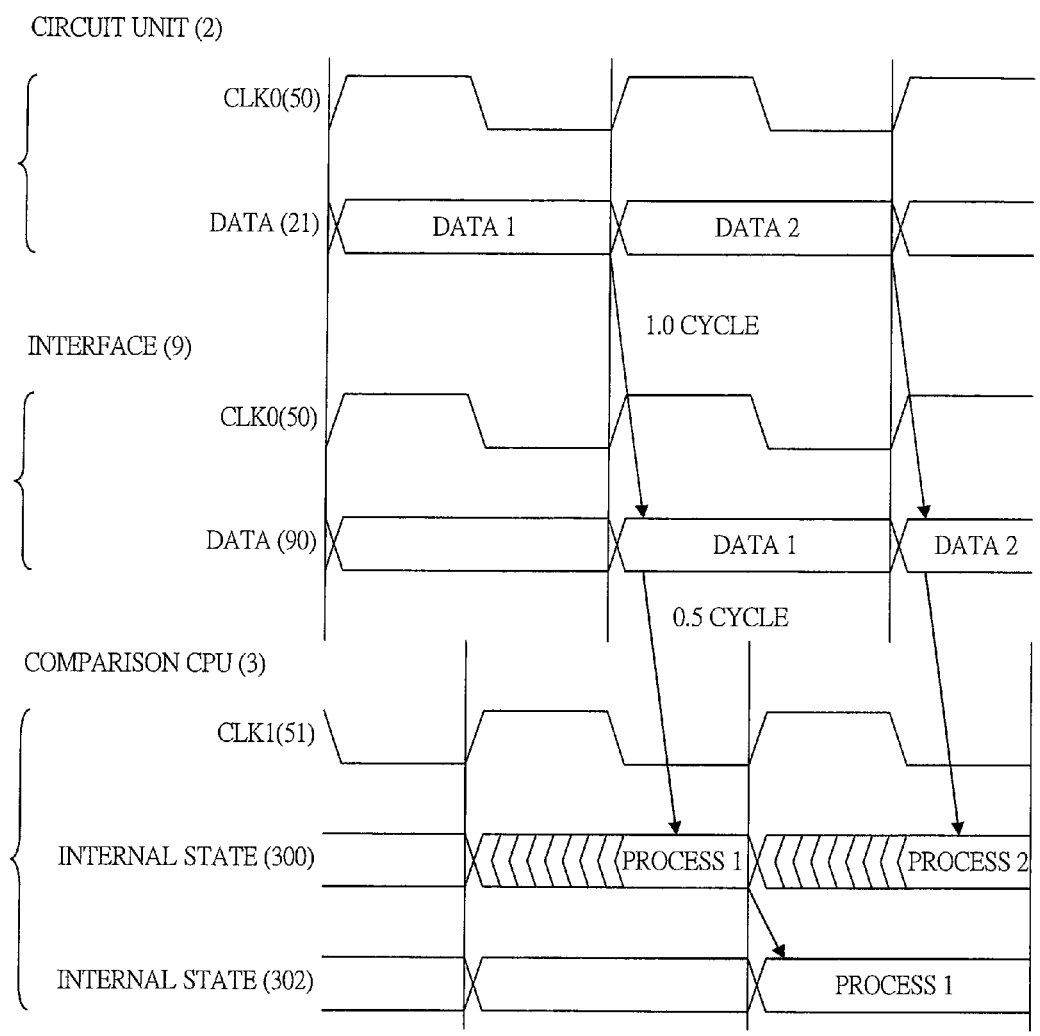
FIG. 8 is a timing chart in the case where a clock signal 50 is used as a clock of the interface circuit in FIG. 4.

FIG. 8 shows a timing chart in the case where the clock signal 50 is used as the clock of the interface circuit 9 in FIG. 4. The output signal 21 of the circuit unit 2 changes in synchronization with the clock signal 50, and the transfer cycle to the flip flop of the interface circuit 9 is 1.0. The comparison CPU 3 operates in synchronization with the clock signal 51, and the transfer cycle from the flip flop of the interface circuit 9 to the flip flop of the comparison CPU 3 is 0.5. This transfer method is effective when the delay of the signal 21 of the circuit unit 2 is large, for example, 60% or more of 1 cycle. Since the transfer cycle from the interface circuit 9 to the flip flop of the comparison CPU 3 is as short as 0.5, it is not in time for 0.5 cycle when the delay in this section is large, and the data cannot be properly held in the flip flop. In order to make the transfer within 0.5 cycle, the operation frequency has to be decreased.

Figure 9:
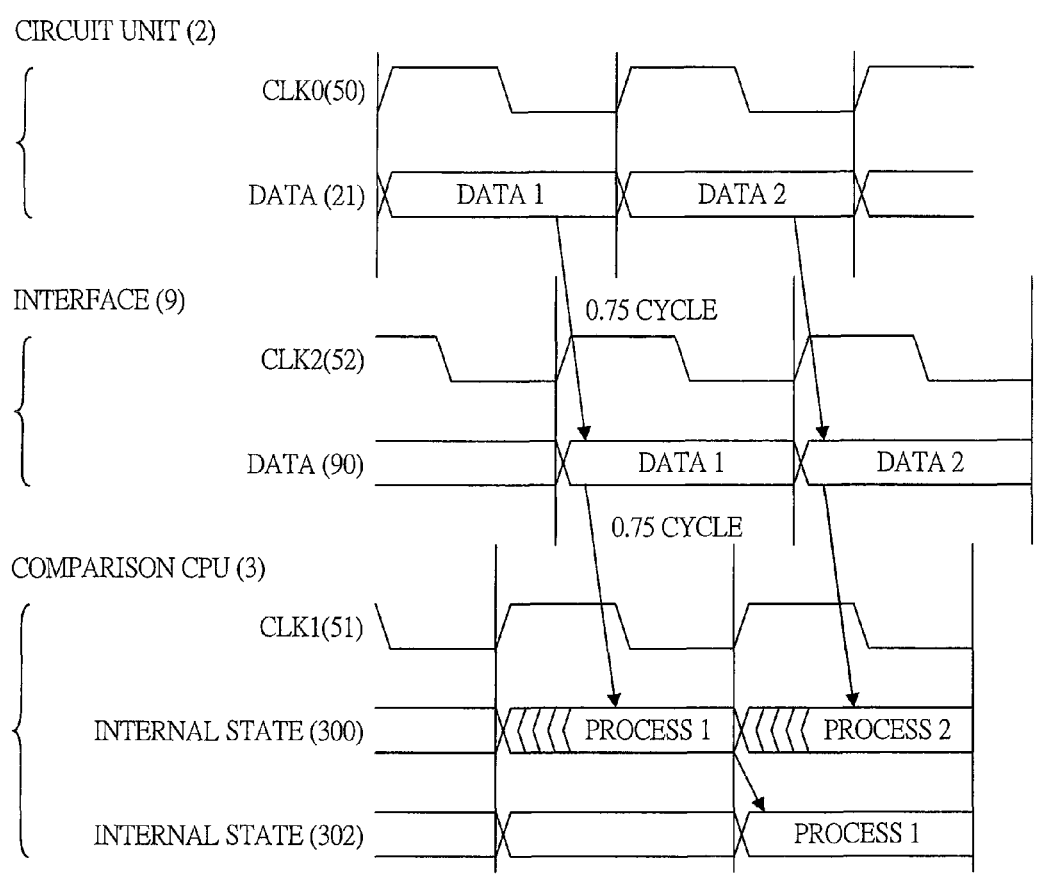
FIG. 9 is a timing chart in the case where a clock signal 52 is used as a clock of the interface circuit in FIG. 4.

FIG. 9 shows a timing chart in the case where the clock signal 52 is used as the clock of the interface circuit 9 in FIG. 4. The output signal 21 of the circuit unit 2 changes in synchronization with the clock signal 50, and the transfer cycle to the flip flop of the interface circuit 9 is 0.75. The comparison CPU 3 operates in synchronization with the clock signal 51, and the transfer cycle from the flip flop of the interface circuit 9 to the flip flop of the comparison CPU 3 is 0.75. This transfer method is effective when the delay of the signal 21 of the circuit unit 2 is 40% to 60% of 1 cycle. When the delay from the flip flop of the circuit unit 2 to the interface circuit 9 is about 0.5 cycle, since the transfer to the interface circuit 9 is not in time in the method of FIG. 5 and the transfer from the interface circuit 9 is not in time in the method of FIG. 6, there is the possibility that the data cannot be properly held in the flip flop. In order to make the transfer within 0.5 cycle, the operation frequency has to be decreased.

Figure 10:
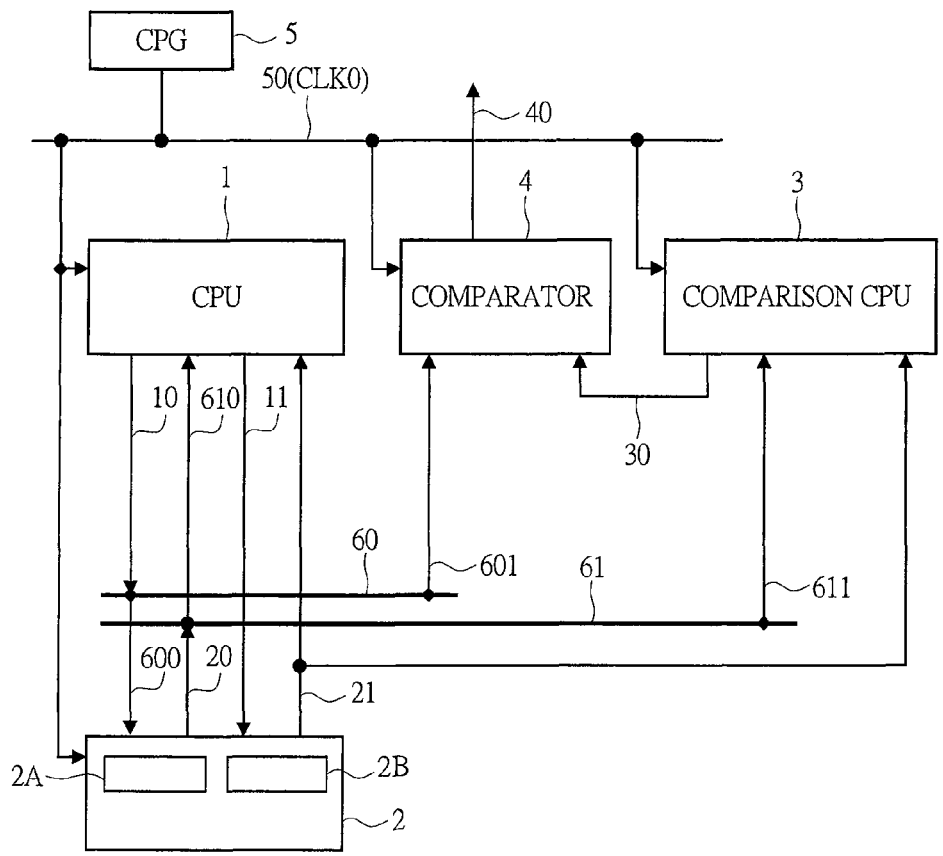
FIG. 10 is a block diagram showing a configuration in which the CPU and the comparison CPU are operated by the same clock CLKO as a comparison example.

A configuration in which the CPU and the comparison CPU are operated by the same clock signal CLKO is shown in FIG. 10 as a comparison example. When comparing FIG. 10 with FIG. 1 and FIG. 5, the CPU, the circuit units 2A and 2B, the comparison CPU 3 and the comparator 4 operate in synchronization with the clock signal 50 (CLK0). The interface circuits 7 to 9 are not provided.

Figure 11:
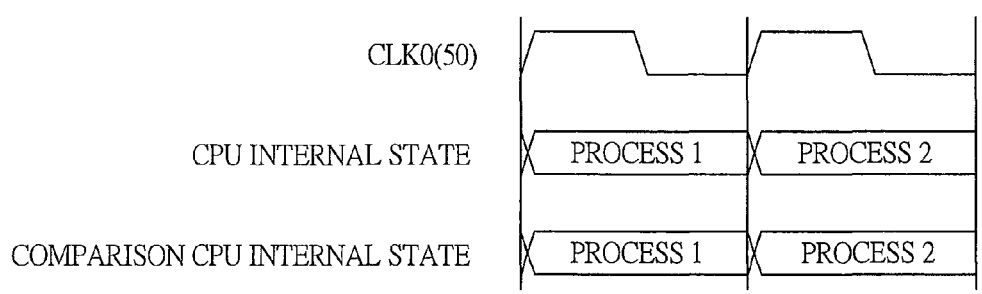
FIG. 11 is a timing chart showing an internal state of the CPU in the comparison example of FIG. 10.

FIG. 11 shows an internal state of the CPU in the comparison example in FIG. 10. The CPU 1 and the comparison CPU 3 perform the process at the same timing in synchronization with the clock signal 50.

Figure 12:
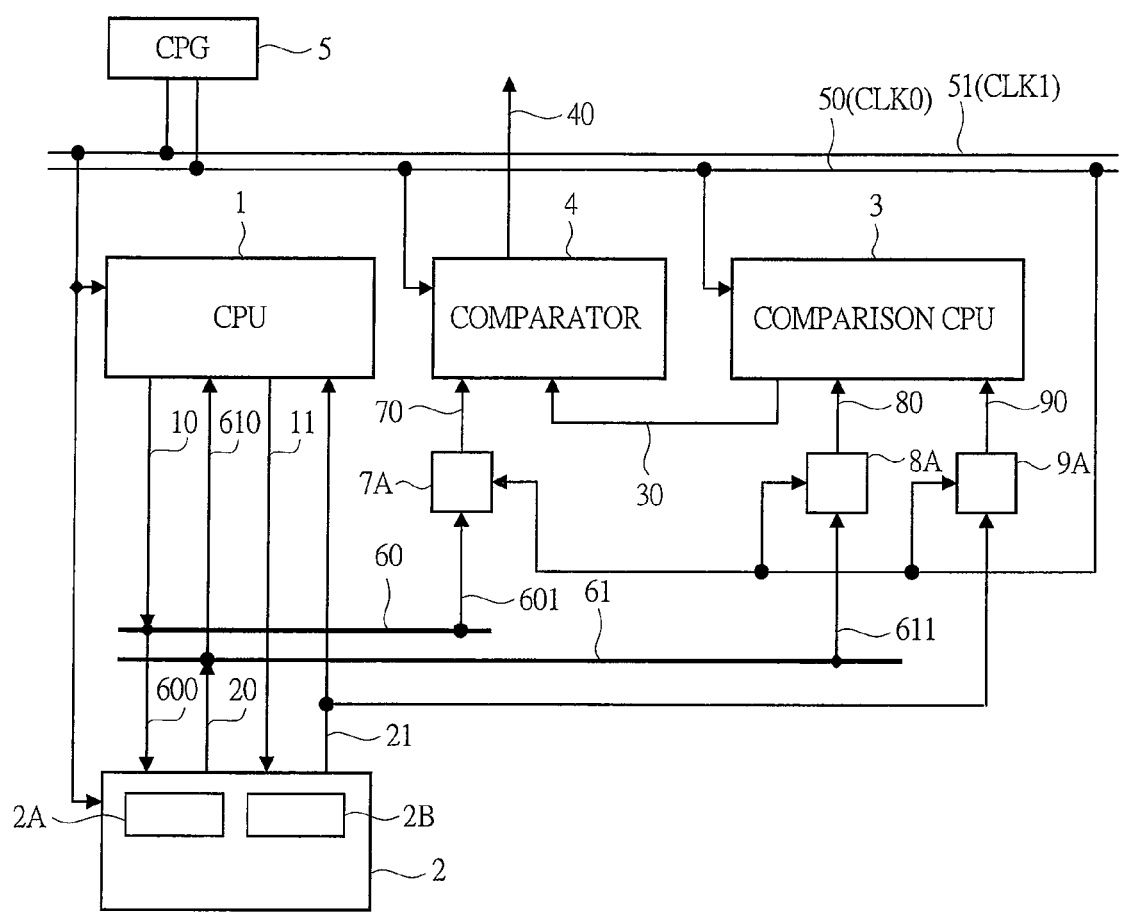
FIG. 12 is a block diagram showing a configuration in which the CPU and the comparison CPU are operated by the clock signals (CLK0, CLK1) having the same cycle and different phases shifted by 0.5 cycle as a comparison example.

A configuration in which the CPU 1 and the comparison CPU 3 are operated by the clock signals 50 (CLK0) and 51 (CLK1) having the same cycle and different phases shifted by 0.5 cycle is shown in FIG. 12 as a comparison example. When comparing FIG. 12 with FIG. 1, the clock signals generated by the CPG 5 are the signals 50 and 51, and the CPU 1 and the circuit unit 2 operate in synchronization with the clock signal 50 (CLK0) and the comparison CPU 3 and the comparator 4 operate in synchronization with the clock signal 51 (CLK1). The interface circuits 7A, 8A and 9A between the buses 60 and 61 and the signal 21 from the circuit unit 2 and the comparison CPU 3 and the comparator 4 hold signals by using the clock signal 51 (CLK1) and then output the same.

Figure 13:
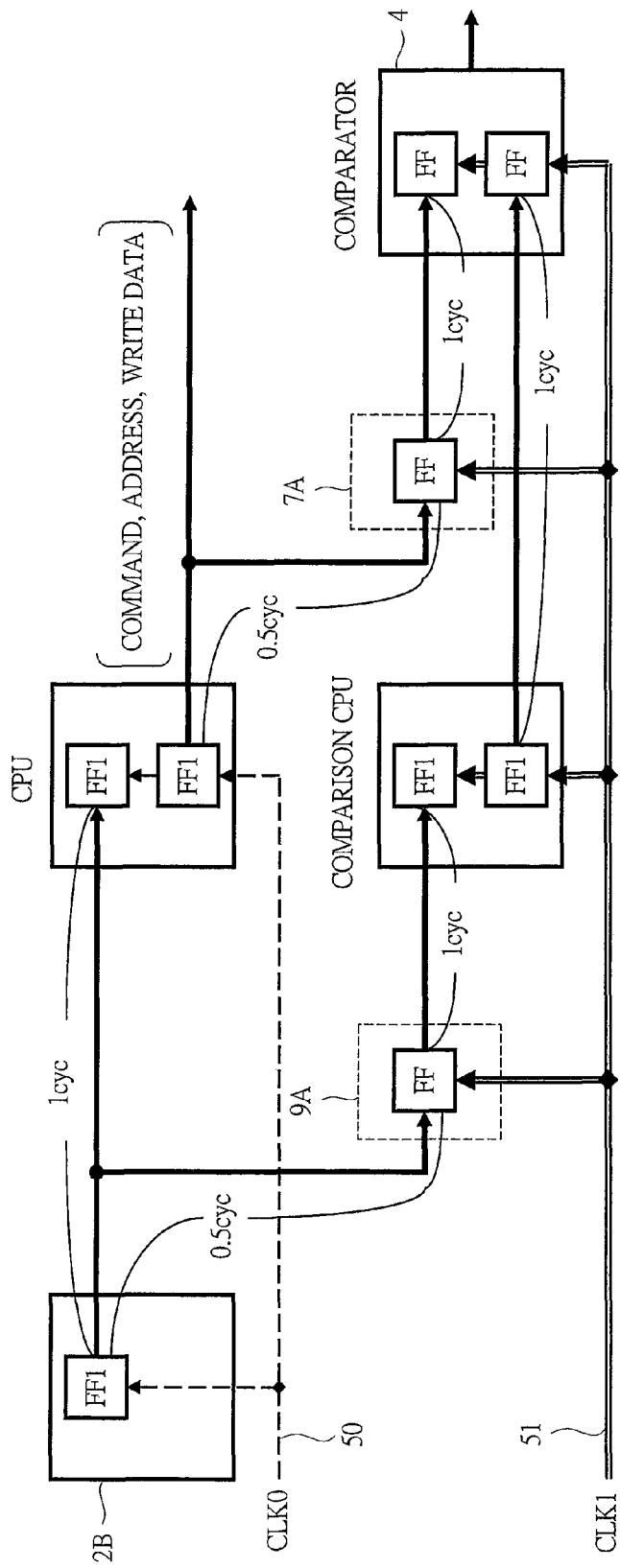
FIG. 13 is a block diagram showing a signal transmission cycle in a signal path from the CPU through the interface circuit to the comparator and a signal transmission cycle in a signal path from the individual connection circuit portion through the interface circuit to the comparator in the configuration of FIG. 12.

FIG. 13 shows a signal transmission cycle in a signal path from the CPU 1 through the interface circuit 7A to the comparator 4 and a signal transmission cycle in a signal path from the individual connection circuit portion 2B through the interface circuit 9A to the comparator 4 in the configuration of FIG. 12. The notation in FIG. 13 conforms to that in FIG. 6.

As is apparent from the foregoing descriptions, since the clock signal 51 is used as the latch clock only for the flip flop in which the signal that is in time for the transfer within the phase difference between the clock signal 50 (CLK0) and the clock signal 51 (CLK1) is inputted, the clock signal 50 is used for the flip flop of the signal whose transfer timing is delayed from it, and it is not necessary to decrease the frequency of the clock signal 50.

In particular, when the configurations of FIG. 1 and FIG. 6 in which the clock signal 52 (CLK2) is used in addition to the clock signals 50 (CLK0) and 51 (CLK1) as the latch clocks of the flip flops FF in the interface circuits 7 to 9 are adopted, the following is taken into account when determining which of the clock signals is to be used for the latch clock. More specifically, it is necessary to transfer the input data from the former stage (circuit unit 2, CPU 1) to the flip flop FF using the second clock signal 51 (CLK1) as the latch clock within the phase difference (0.5 cycle) between the first clock signal 50 (CLK0) and the second clock signal 51 (CLK1), and the output data of the flip flop FF may be transferred to the next stage (comparison CPU 3, comparator 4) within 1 cycle of the second clock signal 51 (CKL1). On the other hand, the input data may be transferred from the former stage to the flip flop FF using the first clock signal 50 (CLK0) as the latch clock within 1 cycle of the first clock signal 50 (CLK0), but the output data of the flip flop FF is required to be transferred to the next stage within the phase difference between the second clock signal 51 (CLK1) and the first clock signal 50 (CLK0). The input data may be transferred from the former stage to the flip flop FF using the third clock signal 52 (CLK2) as the latch clock within the phase difference (0.75 cycle) between the first clock signal 50 (CLK0) and the third clock signal 52 (CLK2), and the output data of the flip flop FF may also be transferred to the next stage within the phase difference between the first clock signal and the third clock signal. A transfer condition on an input side and a transfer condition on an output side of the flip flop FF are mutually reversed between the case where the first clock signal 50 (CLK0) is used as the latch clock and the case where the second clock signal 51 (CLK1) is used as the latch clock, and either one of the input side and the output side has a severer transfer condition. When the third clock signal 52 (CLK2) is used for the latch timing, the difference in the transfer condition between the input side and the output side is reduced. Therefore, when the transfer condition when the first clock signal 50 is used for the latch timing and the transfer condition when the second clock signal 51 is used for the latch timing cannot be satisfied, the transfer condition can be satisfied in some cases by using the third clock signal 52 for the latch timing. In this manner, the flexibility to the request of increasing the operation speed can be enhanced compared with the case where only the clock signals 50 and 51 are used for the flip flops of the interface circuits 7 to 9.

If the wiring delay of the next stage path is set so that the signal delay to the flip flop of the next stage circuit is smaller than 0.5 cycle in all of the flip flops of the interface circuits 7 to 9, it becomes possible to determine which of the latch clocks is to be used while paying attention only to the input signal delay of the flip flop.

As described above, when the operation frequency of the microcontroller MCU is to be increased, adaptation to the high-speed operation is possible by the simple design change of changing the latch clock of a part of the flip flops from the second clock signal 51 (CLK1) to the third clock signal 52 (CLK2) or the first clock signal 50 (CLK0). Also, since the CPU 1 and the comparison CPU 3 are operated by the clock signals having different phases, the peak of the power supply system noise can be reduced compared with the case where the clock signals having the same phase are used, and further the defects can be detected even when the same failure occurs in both the CPU 1 and the comparison CPU 3.

Figure 14:
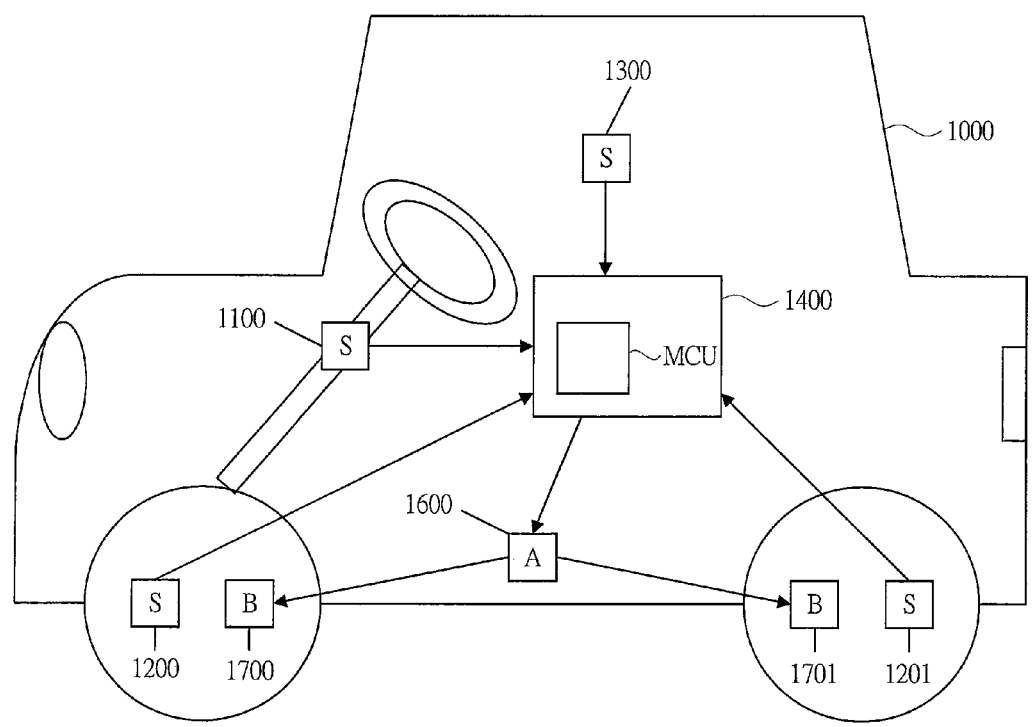
FIG. 14 is a block diagram showing an example of a stability control system of an automobile using the microcontroller.

FIG. 14 shows an example of a stability control system of an automobile using the microcontroller MCU. In an automobile 1000, a reference numeral 1100 denotes a steering angle sensor for detecting the steering of a driver, reference numerals 1200 and 1201 denote wheel speed sensors, and a reference numeral 1300 denotes a yaw rate sensor for detecting a behavior of the vehicle. The information from these sensors is inputted to a stability control unit 1400 and processed in the microcontroller MCU, and commands are provided to a brake actuator 1600 to control brakes 1700 and 1701. When a failure of the system is detected by an output signal 40 of the microcontroller MCU, the system is stopped so as to prevent the runaway of the stability control system, thereby securing the safety.

Figure 15:
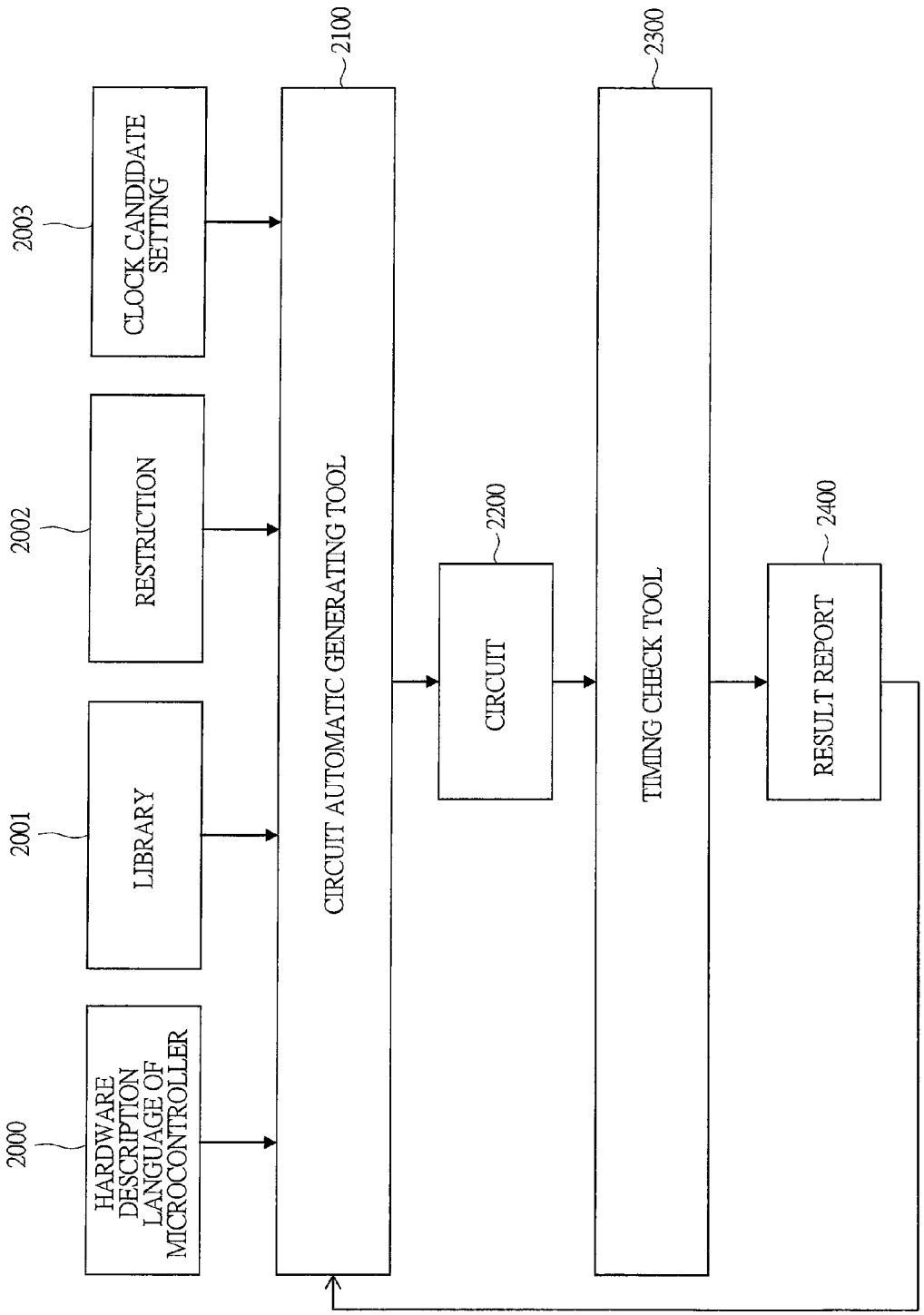
FIG. 15 is a flowchart showing an example of a design method of the microcontroller, in particular, a design automation method for determining the clock signals used for respective flip flops FF in the interface circuits.

FIG. 15 shows a design method of the microcontroller MCU, in particular, a design automation method for determining the clock signal used for respective flip flops FF in the interface circuits 7, 8 and 9. The method shown in FIG. 15 is performed by using a design tool applied to a computer device such as an engineering workstation.

A hardware description language 2000 of the microcontroller is hardware description language information obtained by describing functions of components constituting the microcontroller MCU such as the CPU 1, the circuit unit 2 and others in FIG. 1 and connection information thereof by using hardware description language such as HDL. A library 2001 is device information of a circuit to be generated and includes information such as a function, speed and area of a basic cell and others. A restriction 2002 includes information such as a cycle of a clock and timing information of a terminal. A clock candidate 2003 is a setting added in the present invention, and is information for specifying the flip flop FF whose clock signal is not yet determined and a latch clock to be a candidate. For example, there are candidates of the clocks signals 50, 51 and 52 for the interface circuits 7, 8 and 9 in FIG. 1. Connection is made to a virtual clock signal in the hardware description language 2000 of the microcontroller, and reconnection to an optimum clock signal is made in accordance with the timing after the circuit is generated. A circuit automatic generating tool 2100 performs the conversion from the hardware description language 2000 of the microcontroller into the actual circuit information (gate-level netlist) 2200. The circuit information 2200 is inputted to a timing check tool 2300, and the timing check tool 2300 calculates the delay in the path between the flip flops and between the terminal and the flip flop to output the result to a report 2400. With respect to the flip flops FF specified by the clock candidate 2003, results whether or not the timings required for each clock signal specified as candidates are satisfied are outputted as a report. Based on this report result, the clock signal of the flip flop FF in which the clock signal is not yet determined or the clock signal candidate is inadequate is determined, and the hardware description language 2000 of the microcontroller MCU is corrected by the design tool. As a desirable embodiment, an optimum clock is automatically selected and connected by providing the result report 2400 to the circuit automatic generating tool 2100, and this is reflected on the circuit information 2200.

In the foregoing, the invention made by the inventors of the present invention has been concretely described based on the embodiments. However, it is needless to say that the present invention is not limited to the foregoing embodiments and various modifications and alterations can be made within the scope of the present invention.

For example, the latch clocks to be connectable to the flip flops of the interface circuits 7 to 9 may be two types of latch clocks having a phase difference of 0.5 cycle. Also, a phase difference of a latch clock added when three types of latch clocks are to be used is not limited to 0.75 cycle and can be appropriately determined depending on the function of the clock pulse generator. The data processing unit is not limited to a CPU. For example, it may be a CPU core provided with a cache memory, an address translation buffer and others, a CPU core in which accelerators such as a floating point arithmetic unit and others are tightly coupled, a processor core including a RAM, a ROM and others, or other appropriate data processing units having a data operation function and a bus master function. It is desired that the flip flops included in the interface circuit are the so-called master-slave flip flop. The latch operation may be of the edge trigger type or the level sensing type.

What is claimed is:

1. A microcontroller comprising:
    a first data processing unit operated in synchronization with a first clock signal;
    a circuit unit operated in synchronization with the first clock signal based on a control of the first data processing unit;
    a second data processing unit performing the same data processing as the first data processing unit with a delay from the first data processing unit for an identical process in synchronization with a second clock signal having the same cycle as the first clock signal;
    a first interface circuit having a plurality of flip flops for holding a first signal outputted from the first data processing unit to the circuit unit;
    a comparator which compares a second signal outputted from the second data processing unit in response to an output of the first signal by the first data processing unit and the signal held in the first interface circuit in synchronization with the second clock signal; and
    a second interface circuit having a plurality of flip flops for holding a third signal supplied from the circuit unit to the first data processing unit and outputting the same to the second data processing unit,
    wherein the plurality of flip flops in the first and second interface circuits include those using the first clock signal for defining a latch timing and those using the second clock signal for the same.

2. The microcontroller according to claim 1,
    wherein the plurality of flip flops in the first and second interface circuits further include those using a third clock signal, which has the same cycle as the first clock signal, for defining the latch timing.

3. The microcontroller according to claim 2,
    wherein the first signal is a command, an address and write data outputted from the first data processing unit to a bus,
    wherein the second signal is a command, an address and write data outputted from the second data processing unit, and
    wherein the third signal is read data and a command outputted from a memory to the bus in accordance with the command and the address outputted from the first data processing unit to the bus.

4. The microcontroller according to claim 3,
    wherein the third signal is data outputted to the first data processing unit and the second data processing unit from a peripheral circuit operated in accordance with control data outputted from the first data processing unit.

5. A control system for controlling an automotive powertrain system, the control system comprising:
    a control circuit;
    a sensor having an output connected to the control circuit; and
    an actuator whose operation is controlled by the control circuit,
    wherein the control circuit includes:
    a first data processing unit operated in synchronization with a first clock signal;
    a circuit unit operated in synchronization with the first clock signal based on a control of the first data processing unit;
    a second data processing unit performing the same data processing as the first data processing unit with a delay from the first data processing unit for an identical process in synchronization with a second clock signal having the same cycle as the first clock signal;
    a first interface circuit having a plurality of flip flops for holding a first signal outputted from the first data processing unit to the circuit unit;
    a comparator which compares a second signal outputted from the second data processing unit in response to an output of the first signal by the first data processing unit and the signal held in the first interface circuit in synchronization with the second clock signal; and
    a second interface circuit having a plurality of flip flops for holding a third signal supplied from the circuit unit to the first data processing unit and outputting the same to the second data processing unit, and
    wherein the plurality of flip flops in the first and second interface circuits include those using the first clock signal for defining a latch timing and those using the second clock signal for the same.

6. The control system according to claim 5,
    wherein the plurality of flip flops in the first and second interface circuits further include those using a third clock signal, which has the same cycle as the first clock signal, for defining the latch timing.

7. The microcontroller according to claim 6,
    wherein the first signal is a command, an address and write data outputted from the first data processing unit to a bus,
    wherein the second signal is a command, an address and write data outputted from the second data processing unit, and
    wherein the third signal is read data and a command outputted from a memory to the bus in accordance with the command and the address outputted from the first data processing unit to the bus.

8. The microcontroller according to claim 7,
    wherein the third signal is data outputted to the first data processing unit and the second data processing unit from a peripheral circuit operated in accordance with control data outputted from the first data processing unit.

9. A design method of a microcontroller for generating gate-level netlist from hardware description language of the microcontroller according to claim 1 by using a computer device, the design method comprising the steps of:

generating the gate-level netlist by inputting clock candidate data for specifying which of the first clock signal and the second clock signal is to be used as the latch clock of the respective flip flops, to computer devices together with hardware description language data; and determining adequacy of a clock candidate by a timing check using the generated gate-level netlist.

10. The design method according to claim 9, wherein the gate-level netlist is corrected so that an inadequate clock candidate is replaced with an adequate clock candidate based on a determination result about the adequacy of the clock candidate.

11. A design method of a microcontroller for generating gate-level netlist from hardware description language of the microcontroller according to claim 2 by using a computer device, the design method comprising the steps of:

generating the gate-level netlist by inputting clock candidate data for specifying which of the first clock signal, the second clock signal and the third clock signal is to be used for specifying latch timings of the respective flip flops, to computer devices together with hardware description language data; and determining adequacy of a clock candidate by a timing check using the generated gate-level netlist.

12. The design method according to claim 11, wherein the gate-level netlist is corrected so that an inadequate clock candidate is replaced with an adequate clock candidate based on a determination result about the adequacy of the clock candidate.

* * * * *